June 9, 1959
J. C. LEE
2,890,323
ARC WELDER
Filed Sept. 7, 1956
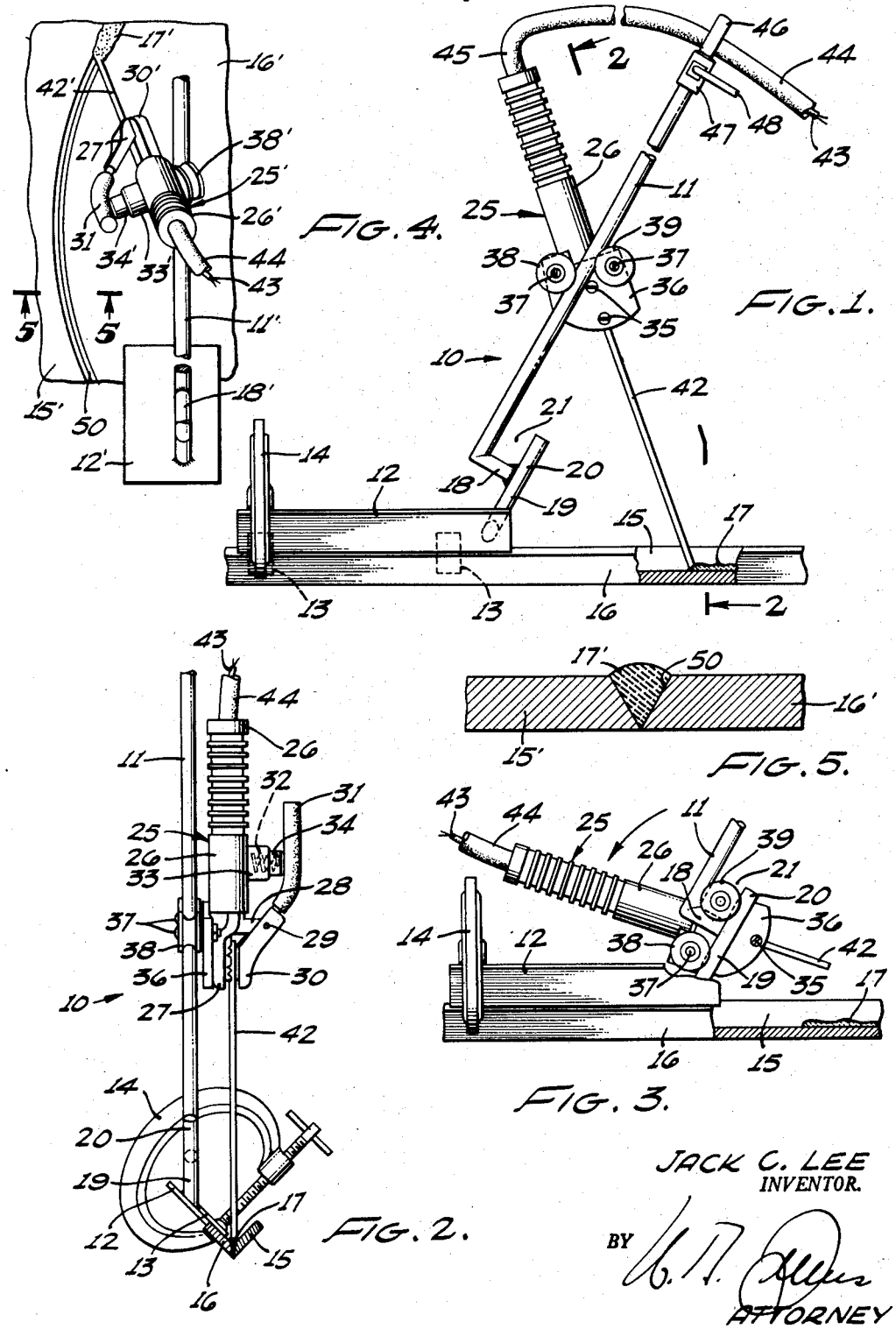
JACK C. LEE
INVENTOR.
BY
ATTORNEY United States Patent Office 2,890,323
Patented June 9, 1959

2,890,323

ARC WELDER

Jack C. Lee, Arcadia, Calif.

Application September 7, 1956, Serial No. 608,617

20 Claims. (Cl. 219—130)

This invention relates to arc welding and more particularly to an improved self-feeding, self-aligning welder incorporating means for extinguishing the welding arc automatically at the end of the welding operation without need for circuit breakers or like devices customarily relied upon to interrupt the power supply to the electrode.

Self-feeding arc welders of a variety of designs have heretofore been proposed having as a principal object the formation of a welded joint without the aid of a workman to guide or advance the fusible electrode, reliance being had on the melting of the electrode to advance it progressively at a rate governed by the melting. These devices are subject to certain objectionable disadvantages and shortcomings which are obviated by the present invention. Such devices conventionally rely on gravity to advance an electrode supported at an angle to the horizontal, the advance being controlled in such manner that the angle of the electrode remains constant as it is consumed in forming the weld. At the end of the welding run various expedients have been employed to actuate automatically a switch or other power supply interrupting means as a safety measure and to avoid the consequences attending the continuance of the arc. However, the provision of switches or other interrupter devices adds to the cost and complexity of the equipment and increases the likelihood of mechanical failure.

The present invention entirely obviates the shortcomings of prior constructions by providing an automatic self-feeding welder reduced to the prime essentials and eliminating a circuit breaker as a separate component. In lieu of the circuit breaker previously employed, the invention provides a rigid guide rail or support for the movable electrode holder which guide rail is shaped to cause the electrode holder to pivot automatically in a manner to extinguish the welding arc at the instant the electrode terminates its travel. As disclosed the pivoting of the holder to extinguish the arc is gravity-actuated rendering unnecessary power-driven means to accomplish the desired movement. The terminus of the guide rail is so constructed as to hold the lifted electrode against movement in all directions except a reverse pivoting movement thereby providing assurance against the electrode coming in contact with adjacnt members of the structure being welded.

The invention embodies other features such as an electrode holder adapted for ready removal from the guide rail of the automatic equipment for manual use by the operator for tack welding or the like operations without the need for disassembling any parts of the holder or of the equipment generally. Stated differently, the electrode holder of the present invention makes use of a conventional manual-type electrode holder supplemented at the lower end of its handgrip portion with a pair of rollers so positioned as to cooperate with an inclined rigid guide rail when mounted thereon to convert the manual holder to an automatic self-feeding, self-aligning welder. The heavily insulated lead wire extending from the end of the holder handle is utilized as a gravity-actuated feeding means assuring the advance of the holder along the guide rail as well as the means for speedily counterbalancing the electrode and breaking the welding arc as the device reaches the offset appropriately positioned to break the arc and discontinue the advance of the welding electrode as the welding operation is completed.

Another important feature of the invention is the use of a guide rail and electrode support so constructed and arranged that the presence of the electrode in the groove customarily present between the parts being welded acts to guide the electrode accurately along the joint to be welded irrespective of whether the joint is straight or curved, this guidance being accomplished positively and automatically without attention from the operator.

It is a primary object of the present invention to provide an improved automatic welder featuring simplified means for interrupting the arc automatically at the end of the welding operation.

Another object of the invention is the provision of a self-feeding, self-aligning arc welder making use of the groove or recess between parts being joined to maintain the electrode centered. In cases in which the parts being joined provide a V-notch between their adjacent surfaces, such surfaces are effective to maintain the electrode aligned.

Another object of the invention is the provision of a self-feeding arc welder employing the extension of the electrode in the recess between the parts being welded as the guide means.

Still another object of the invention is the provision of self-feeding arc welding apparatus employing an electrode holder which can be readily and quickly detached from its supporting guide rail for manual use merely by grasping its handle and manipulating it through a simple disconnecting path of movement.

A further object of the invention is the provision of an automatic welding device employing a gravity-actuated electrode holder mounted on a guide rail having a recess cooperable with the holder to pivot the latter automatically to extinguish the welding arc at the end of the weld.

Another object of the invention is the provision of automatic arc welding equipment comprising two principal components one of which remains stationary and the other of which is mounted for movement along the stationary member.

These and other objects and advantages of the invention will be more fully set forth in the following specification and claims considered in connection with the attached drawing to which they relate.

In the drawing:

Figure 1 is a side elevational view of the arc welding equipment with a portion of the joint being welded away to show the position of the electrode;

Figure 2 is a transverse sectional view taken along the broken line 2—2 on Figure 1;

Figure 3 is a fragmentary view showing the electrode holder rotated to an arc-extinguishing position and rigidly held against movement until manipulated by the workman;

Figure 4 is a fragmentary top plan view of the welder as used to form an arcuate weld; and Figure 5 is a cross-sectional view taken along line 5—5 on Figure 4.

Referring to Figures 1 and 2, it will be observed that a preferred embodiment of the welder designated generally 10 comprises an inclined guide rail 11 of circular cross-section rigidly fixed to a supporting base 12 suitably supported immovably on the parts being welded and opposite the end of the joint. It will be understood that base plate 12 may have various shapes. For example, it may comprise a flat, thick-walled member of sufficient weight to hold the equipment stationary adjacent the workpiece without the need for clamping devices. In other instances such as that here illustrated, plate 12 is provided with a pair of tangs 13, 13 projecting beyond one longitudinal edge so that they may be rigidly clamped, as by a C-clamp 14, to one of the members 15 being welded. As herein illustrated a pair of members 15, 16 arranged substantially at ninety degrees to one another are to be joined by welding. While the abutting edges are shown as chamfered at forty-five degrees, it will be recognized that the chamfer may be at a more acute angle permitting weld 17 to extend substantially to the exterior corner of the mating edges.

Alternately the chamfer may be omitted entirely and the flat edge of one member brought into contact with the sloping face of the other member.

Guide rail 11 is seen to include at its lower end a short leg 18 extending at right angles and to which is rigidly fixed the base end 19 including an extension 20 projecting upwardly beyond leg 18 to provide a locking recess 21 the purpose of which will become apparent. Leg 18 in cooperation with base portion 19 constitutes an offset or recess in the guide rail which functions automatically to extinguish the arc at the end of the welding operation in a manner which will be described.

The electrode holder forming an important feature of this invention and designated generally 25 comprises a conventional hollow handgrip 26 preferably of heat insulating material having one jaw 27 of a metal electrode holder fixed to its lower end. Pivotally mounted by a pin 29 on a bracket 28 projecting from jaw 27 is the movable jaw 30 of the electrode clamp. Projecting from jaw 30 is an extension 31 which is biased by a coil spring 32 to pivot counterclockwise about pin 29 enclosed by housing 33 including a displaceable thimble 34.

Rigidly fixed to jaw 27 on the side opposite jaw 30, as by screws 35, is a thick plate of insulation material 36. Rotatably supported on a pair of shoulder bolts 37 mounted on plate 36 are a pair of flanged rollers 38 and 39, the distance between the facing edges of their aligned flanges being slightly greater than the diameter of guide rail 11, as is best shown in Figures 1 and 2. From Figure 2 it will be observed that the peripheries of rollers 38 and 39 are grooved and conform generally to the contour of guide rail 11 and so act to maintain the holder accurately aligned with the guide rail axis while permitting the holder to pivot in an arc normal to this axis. It will be understood that when the holder 25 is pivoted to lie at an angle to the guide rail 11, the grooves of the rollers embrace the sides of the guide rail at longitudinally spaced points therealong. However, if the holder is rotated so that handgrip 26 lies generally parallel to the guide rail it can be shifted laterally since, under these conditions, the guide rail is positioned to pass readily between the flanges of the rollers, it being recalled that the distance between the flanges is greater than the diameter of the supporting rail. It will therefore be recognized that the holder is adapted to be assembled to or detached from the guide rail by the simple expedient of positioning the handle 26 parallel to the rail 11 and then moving the handle toward or away from the rail.

It will be observed from Figure 1 that rollers 38 and 39 are offset laterally to the sides of the holder and also offset longitudinally therealong. The last-mentioned offset may be varied over a considerable range but is preferably such that the axis of roller 38 lies slightly below the axis of roller 39 when the holder is assembled on rail 11 for automatic operation. Under these circumstances roller 38 engages the upper side of rail 11 at a point spaced from the point of contact of roller 39 a distance somewhat greater than the diameter of short leg 18 of the rail and for a reason which will become apparent.

The usual fusible electrode 42 is clamped between jaws 27 and 30 of the holder and a conventional flexible electrical conductor 43 covered with insulation 44 extends through the hollow hand grip 26 and is rigidly connected to fixed jaw 27 of the electrode clamp. A loop 45 of the electrical conductor extends between and is gripped by the legs of an upwardly opening resilient V-clip 46 mounted on a cap 47 detachably clamped to the upper end of the guide rail by a thumb screw 48.

In the use of the device illustrated in Figure 1, base 12 of guide rail 11 is rigidly anchored to the workpiece as by one or more C-clamps 14 opposite one end of the joint to be welded with the rail 11 extending toward and, of course, above the weld to be made. An electrode 42 is clamped between jaws 27, 30 and holder 25 is assembled to the upper end of the guide rail in the manner described above. The length of electrode 42 is selected in accordance with customary practice in the use of self-feeding welders such that its end will lie at the remote end of the joint to be formed. The insulated supply cable 44 is clamped between the jaws of clip 46, care being exercised to provide a loop 45 adequate to accommodate the travel of the holder downwardly along the guide rail and to provide sufficient weight to assure counterbalancing of the holder counterclockwise as viewed in Figure 1. When so counterbalanced, rollers 38 and 39 abut the opposite sides of the rail and support the holder for free movement therealong as the electrode is consumed in forming weld 17.

The unit is now in condition for automatic operation as soon as current is supplied to the device, it being understood that one side of the power supply is connected to conductor 43 and the other to workpieces 15 and 16. An arc forms immediately between the end of the electrode 42 and workpieces 15 and 16 causing the electrode tip to fuse and join with the abutting areas of the joint. The melting of the electrode tip shortens the length of the electrode and allows holder 25 to move downwardly along the guide rail as the electrode advances along the joint. In this manner, the electrode advances automatically along the joint to provide a uniform weld equal if not superior to that obtainable when the electrode is held by a skilled welder.

By the time the electrode has traveled to the end of the joint to be welded, roller 38 will be in a position to ride off the lower end of the main leg of the supporting rail as roller 39 seats in recess 21 where it is held captive by short leg 18 and extension 20 of the supporting rail in the manner clearly illustrated in Figure 3. This change in relative positions of the rollers 38 and 39 is accompanied by the tilting of the entire holder 25 about the roller 39 as an axis and the lifting of the electrode 42 upwardly from the work. It will also be apparent that roller 38 comes to rest against the base portion 19 of the guide rail and cooperates with roller 39 in locking holder 25 rigidly against movement in any direction except clockwise about the axis of roller 39. In this manner positive assurance is provided against the energized electrode 42 being brought into contact accidentally with the workpiece or some other part of the equipment connected to the grounded side of the power supply.

If the operator wishes to touch up any part of the joint or to use the holder to make another adjacent weld too short to justify making by a self-feeding set-up, he merely pivots the holder clockwise until its axis is parallel with that of rail 11 and shifts it laterally to disengage it from the rail for manual use in the customary manner. Following completion of this work, the holder is reassembled to the rail as easily as it is laid at rest, that is by holding it parallel with the rail and then shifting it laterally toward the rail to seat rollers 38 and 39 thereon.

The manner in which the present device operates automatically to follow an arcuate or irregularly-shaped weld is illustrated in Figures 4 and 5 wherein circular guide rail 11' is shown supported on a heavily weighted base 12' opposite one end of the arcuate shaped joint 50 to be welded between workpieces 15', 16'. As is shown in Figure 5, joint 50 comprises a V-shaped groove formed by the abutting chamfered edges of workpieces 15', 16' providing a guiding groove for the lower end of electrode 42' as it fuses and advances along the groove. Since rail 11' is circular in cross-section, the holder is free to swing laterally permitting the electrode to shift as necessary to follow groove 50 as the weld is formed. Accordingly, the electrode and the groove 50 are seen to cooperate in maintaining the electrode accurately centered in the joint to be welded as it advances therealong. As will be recognized, the offset provided by leg 13' of the supporting rail operates to terminate the welding operation automatically as described above in connection with the similarly constructed arc extinguishing means for Figures 1 to 3.

While the particular self-aligning, self-feeding electric welder herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An arc welding electrode holder comprising a hollow hand-grip adapted to receive an insulated electrical conductor through one end thereof, a welding electrode clamp fixed to the other end of said handgrip including manually operable means for opening said clamp to replace a used electrode with a new one, and means for movably supporting said holder from a rail comprising a bracket fixed to said holder adjacent said electrode clamp and including a pair of flanged rollers supported against one face of said bracket.

2. An electric welding electrode holder adapted to be held in the hand of an operator as well as movably supported for gravity movement along a guide rail, said holder comprising a handgrip having a readily releasable electrode clamping means extending from one end thereof, a bracket of insulating material fixed to one side of said holder adjacent said clamp means and having a plurality of flanged rollers mounted thereon, the flanges on the outer ends of said rollers being unobstructed and being spaced apart sufficiently to permit the rollers to be moved laterally onto or from an inclined guide rail support for said holder whereby the same may be selectively supported in the hands of an operator or on a rail support as desired.

3. An article of manufacture comprising, a metallic clamping device adapted to clamp releasably an electrode of the type employed in arc welding, a handgrip secured thereto for manipulating the electrode and having provision for the connection of an electrical conductor to said clamping device, a pair of flanged rollers supported on parallel axes from said clamping device, the axes of said rollers being spaced to either side of the longitudinal axis of said clamping device and of the electrode gripping portion thereof.

4. An article of manufacture as defined in claim 3 wherein the axes of said rollers are offset axially of said handgrip and adapted to clamp against the upper and lower sides of an inclined guide rail when mounted thereon.

5. An article of manufacture as defined in claim 3 wherein said article includes a handgrip of insulation material secured to said clamping device having provision for housing the end portion of said electrical conductor therein, said flanged rollers being located adjacent the end of said handgrip nearest said clamping device and offset to one side thereof.

6. An article of manufacture as defined in claim 3 wherein the periphery of said rollers has a deep arcuate groove adapted to seat about a support rail of circular cross-section.

7. An article of manufacture as defined in claim 3 wherein the axes of said rollers are offset axially of said clamping device and from the center of gravity of said article when an electrical conductor is connected to said clamping device, whereby said article is adapted to be movably supported on an inclined stationary support rail positioned between said rollers, said rollers being held in contact by gravity with the opposite sides of the rail at axially spaced points therealong.

8. An article of manufacture as defined in claim 7 wherein the pivoting of said article in one direction relative to a support rail positioned between said rollers serves to lock the article assembled thereon and wherein pivoting of said article in the opposite direction acts to disengage said rollers from the rail so that the article can be removed laterally therefrom.

9. A self-feeding, self-aligning arc welder comprising an electrode holder adapted to be connected to an electrical conductor, means supporting a plurality of grooved rollers in spaced relation axially and laterally of said holder, a rigid rail substantially circular in cross-section adapted to be supported in an inclined stationary position adjacent one end of an elongated joint to be welded, said rail being adapted to support said holder by means of said rollers and permitting said holder to pivot about the axis of said rail as necessary to maintain an electrode clamped in the holder in alignment with a joint undergoing welding, an electrode secured in said holder with its free end positioned in the joint to be welded and mutually cooperable therewith to maintain the electrode in contact with the joint as the consumption of the electrode allows the electrode holder to roll downwardly along said supporting rail therefor.

10. A self-feeding, self-aligning arc welder as defined in claim 9 wherein said rollers have arcuate grooved peripheries and wherein said supporting rail is circular in cross-section to permit said holder to swing in either direction about the rail axis as required for the free end of the electrode to follow a joint not in true alignment with the rail as the electrode is consumed in the welding of the joint.

11. A self-feeding, self-aligning arc welder as defined in claim 9 including means forming a part of said rigid rail operable to move the free end of the electrode abruptly out of an arc forming relation to the joint being welded as said holder advances to a predetermined position along said rail support and the joint being welded.

12. In an automatic arc welding device, an elongated support member adapted to be supported adjacent one end of a joint to be welded, a gravity actuated electrode holder having a roller movable along said support as the free end of an electrode resting against the joint being welded is melted by an electric arc, said support member having an offset in the path of said roller and positioned to permit said holder and the electrode therein to move to a position breaking the electric arc as the holder advances along said support member to the location of said offset.

13. The invention as defined in claim 12 wherein said support member is provided with an open-ended recess associated with said offset releasably seating and supporting said electrode holder as the same reaches said offset and moves to a position breaking said electric arc.

14. In combination, an automatic electric arc welding device comprising, an elongated support rail for an electrode holder, an electrode holder having a pair of grooved rollers supported on parallel trunnions and positioned for assembly to said rail from the side thereof, an electrical conductor connected directly to said holder, the center of gravity of said holder and conductor assembly being offset axially thereof and effective to rotate said assembly in a direction wherein said rollers are held firmly seated against the opposite sides of said rail.

15. The combination defined in claim 14 wherein the center of gravity of said assembly is located on the opposite side of said rail from said electrode and is effective to urge said holder to pivot said electrode away from the joint to be welded, said support rail having an offset at the lower end thereof, and the weight of said assembly being effective through the rolling connection with said rail to maintain the electrode in contact with the joint until the holder advances to said offset.

16. An automatic self-feeding arc welder comprising an electrode holder having a pair of grooved rollers projecting laterally therefrom and adapted to bear against the opposite sides of an elongated circular support rail adapted to be supported from one end of a joint to be welded, said holder being held at the upper end of said rail by a new electrode clamped therein and having its lower end bearing against the joint to be welded whereby the melting of the electrode allows the holder to move downwardly along the rail and advance the melting end of the electrode along the joint, an electrical conductor connected directly to said holder on the opposite end thereof from said electrode whereby the weight of said conductor is effective to maintain said rollers engaged with said rail and having a minimum effect on the electrode pressure against the joint being welded.

17. An automatic self-feeding arc welder as defined in claim 16 wherein said support rail has an abrupt downwardly-directed offset adjacent the lower end thereof whereby the roller riding along the upper side of said rail can roll into said offset allowing said holder and the electrode carried thereby to pivot and rotate the free end of the electrode out of contact with the joint thereby automatically discontinuing the welding operation while maintaining the current supply to the electrode.

18. That improvement in the automatic arc welding art by the use of a gravity-actuated electrode holder movable downwardly along a guiding support for said holder adapted to be supported at an inclination to the vertical, which improvement comprises means forming part of said inclined support and located near a lower portion thereof operable to move said holder and the electrode carried thereby abruptly out of electrical contact with the joint being welded to thereby discontinue the electric welding arc while maintaining the power supply to said electrode and the joint being welded.

19. An article of manufacture for use as a stationary support for an automatic arc welder comprising a base member adapted to be temporarily supported opposite the end of a joint to be welded, an elongated round support member projecting from said base at an angle thereto lying between zero and ninety degrees to the lower surface of said base member, said support having an abrupt offset therein adjacent said base member, and means providing an upwardly opening recess underlying said support immediately above said offset.

20. An article of manufacture as defined in claim 19 including an open-ended spring clip attached to the upper end of said support adapted to releasably clutch the electrical conductor normally used to supply power to the electrode holder of an arc welder.

References Cited in the file of this patent

UNITED STATES PATENTS

| | | |
|---|---|---|
| 1,497,499 | Girard | June 10, 1924 |
| 1,865,003 | Hall | June 28, 1932 |
| 2,001,004 | Wantz | May 14, 1935 |
| 2,204,545 | Faunce | June 18, 1940 |
| 2,412,660 | Tyrner | Dec. 17, 1946 |
| 2,421,095 | Tyrner | May 27, 1947 |
| 2,422,811 | Tyrner | June 4, 1947 |

FOREIGN PATENTS

| | | |
|---|---|---|
| 550,727 | Great Britain | Jan. 21, 1943 |